Figure 1:
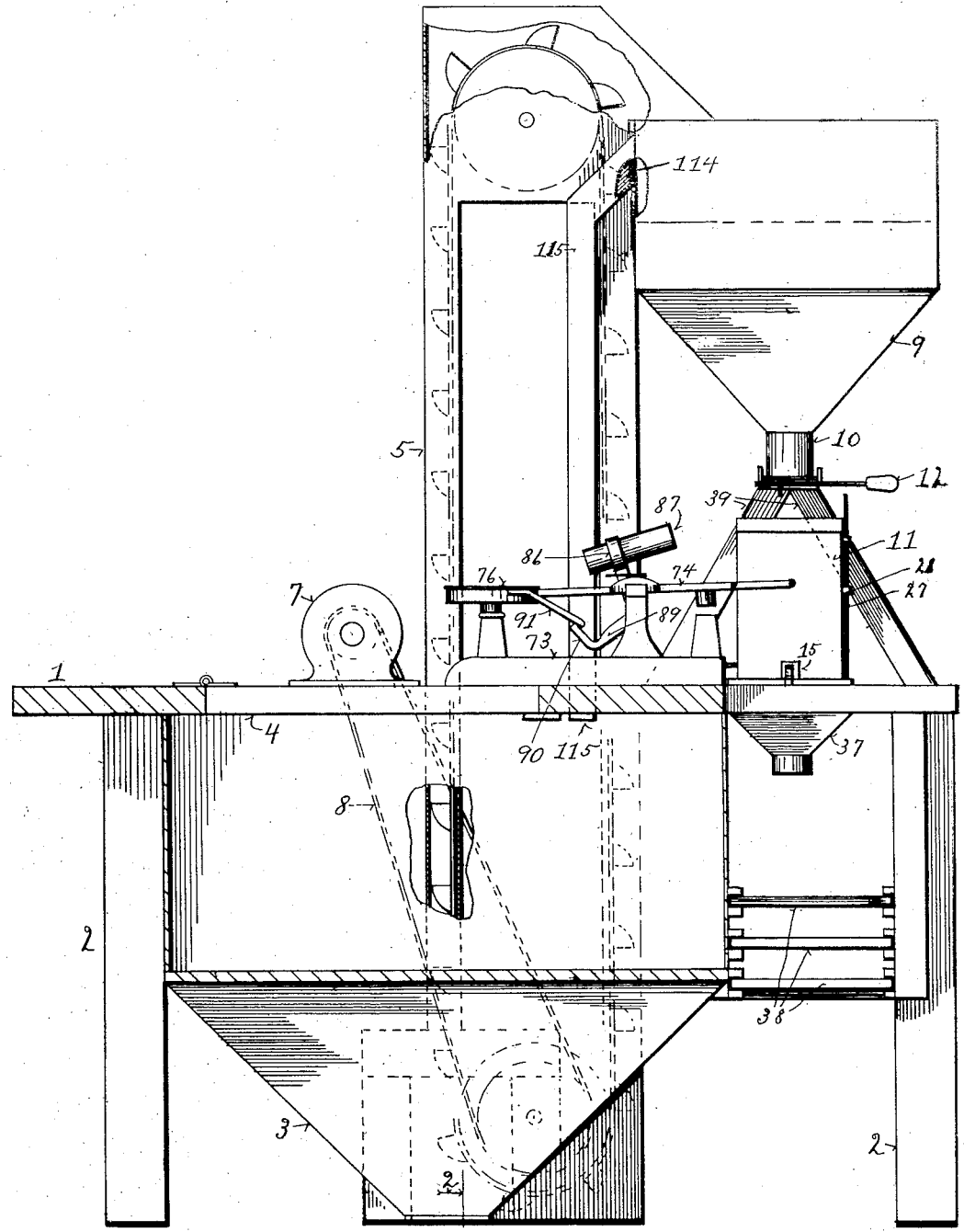

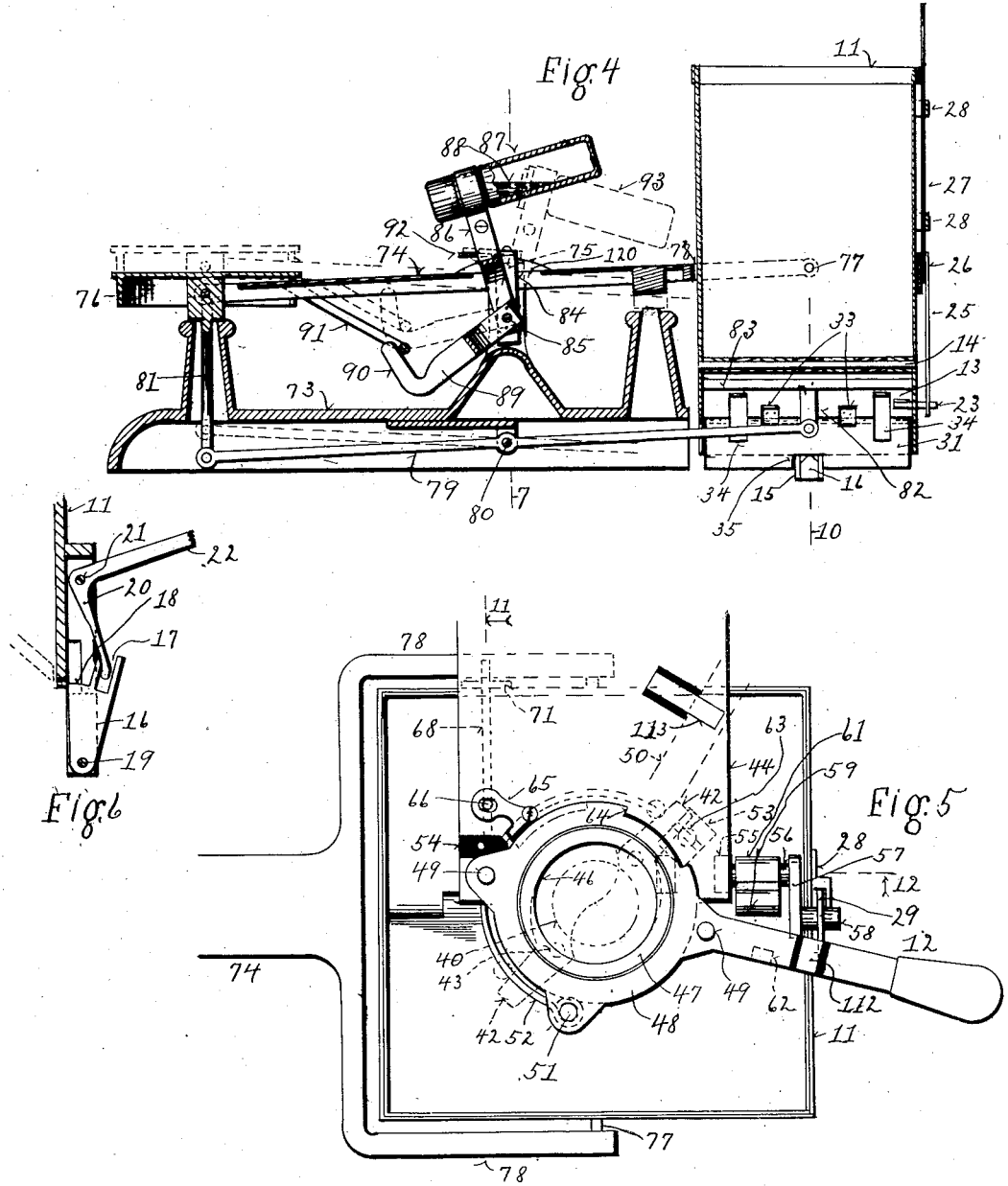

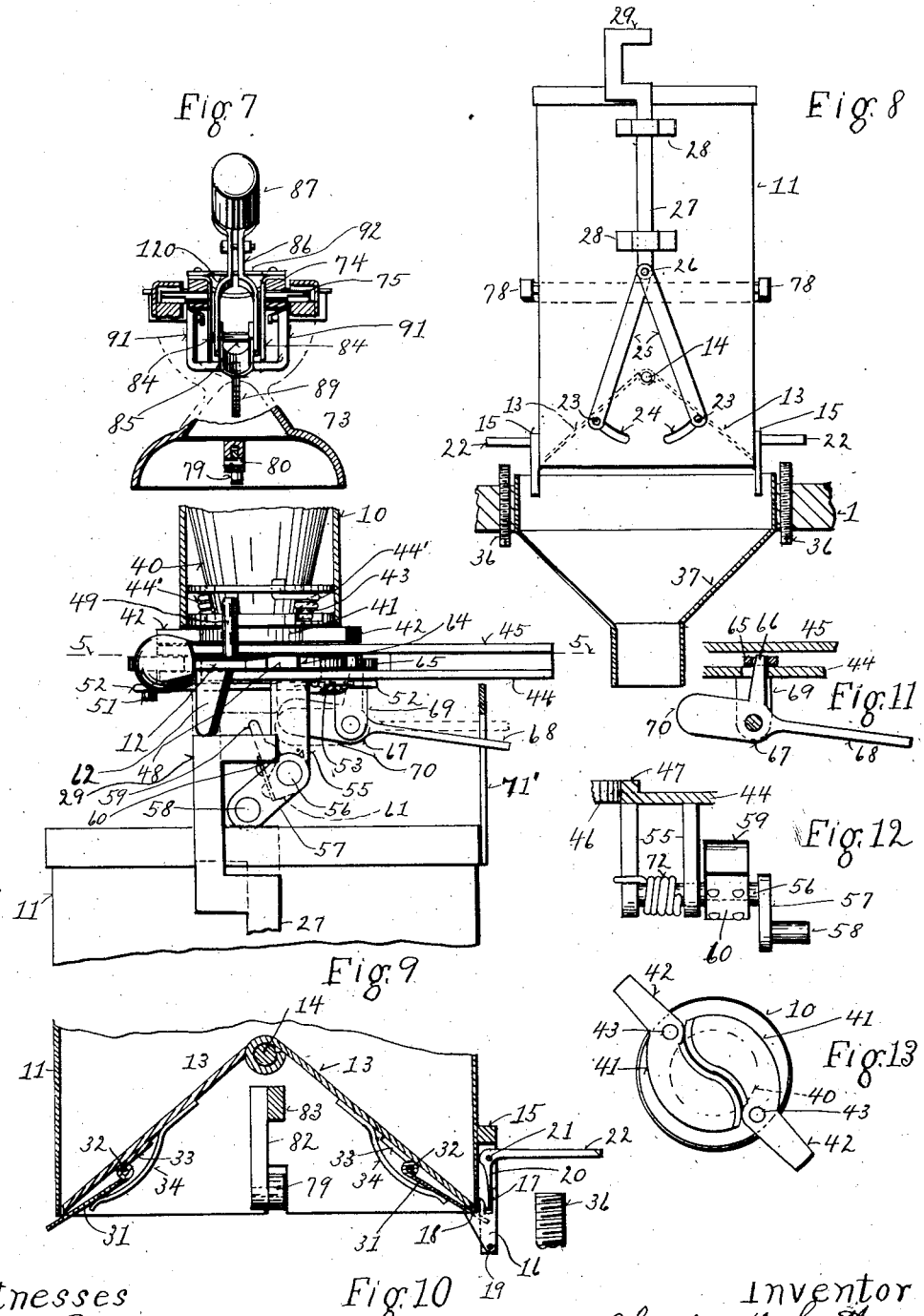

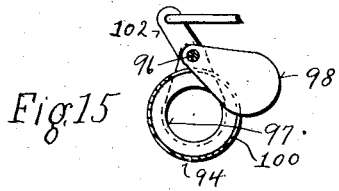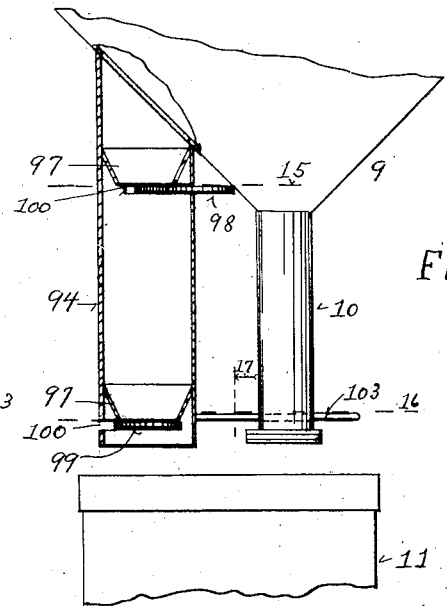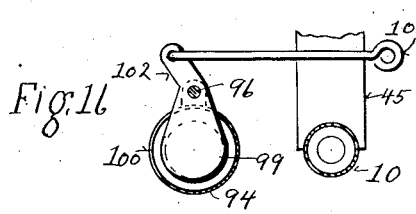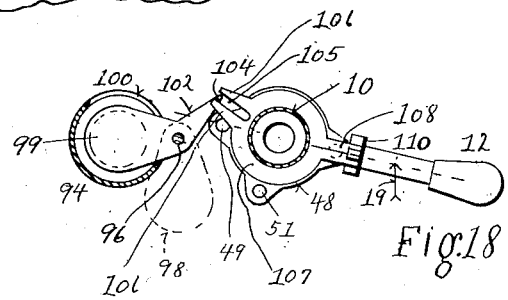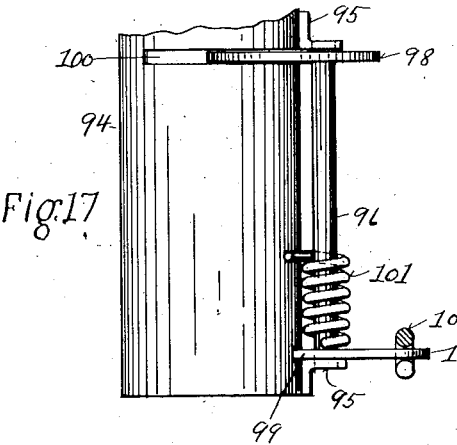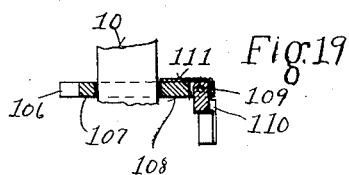

UNITED STATES PATENT OFFICE.

CHARLES D. SCOTT, OF TOPEKA, KANSAS.

AUTOMATIC WEIGHING-MACHINE.

1,087,838.  Specification of Letters Patent.  Patented Feb. 17, 1914.

Application filed September 19, 1913. Serial No. 790,679.

*To all whom it may concern:*

Be it known that I, CHARLES D. SCOTT, a citizen of the United States, residing at Topeka, in the county of Shawnee and State of Kansas, have invented certain new and useful Improvements in Automatic Weighing-Machines, of which the following is a specification.

My invention relates to that class of automatic weighing machines comprising a scale, a weighing receptacle included therein, a hopper or bin from which the commodity to be weighed is fed into the receptacle, and mechanism automatically operable by the scale for cutting off the flow of the commodity from the hopper or bin and for discharging the commodity from the weighing receptacle when the predetermined amount by weight of the commodity has flowed into the receptacle.

My present invention relates more especially to a device for suddenly shifting a weight from one end of the scale-beam to the other, or otherwise suddenly increasing the load on the weighing receptacle end of the beam or decreasing it on the opposite end, so that the increase, actual or relative, of the load on the weighing receptacle end of the scale-beam shall be sufficient quickly and positively to operate or release the automatic mechanism referred to; such device being necessary on account of the fact that when the scale-beam is poised equally, it cannot of course operate or release such mechanism.

My invention further relates to arrangements and devices especially designed to make the machine adaptable for use by the retailer; special features in this regard being an auxiliary chute for discharging into the weighing receptacle a large volume of the commodity less than the desired weight; also an arrangement of a table with a bin below the machine, a small hopper above the machine, and an elevator for raising the commodity from the lower bin to the hopper. The special object of this last feature is to avoid the use of the large bin above the machine and to enable the commodity to be supplied to the larger hopper below instead of lifting it up above the machine.

Further objects and the details of the various features of my invention will appear hereinafter.

In the drawings accompanying and forming part of my invention and in the description of the drawings I have shown my invention in its preferred form and what I deem to be the best mode of applying the principles thereof; but it is to be understood that within the scope of the appended claims I contemplate changes in form, sizes, proportions, and materials, the transposition of parts, and the substitution of equivalent members, without departing from the spirit of my invention.

Figure 2:
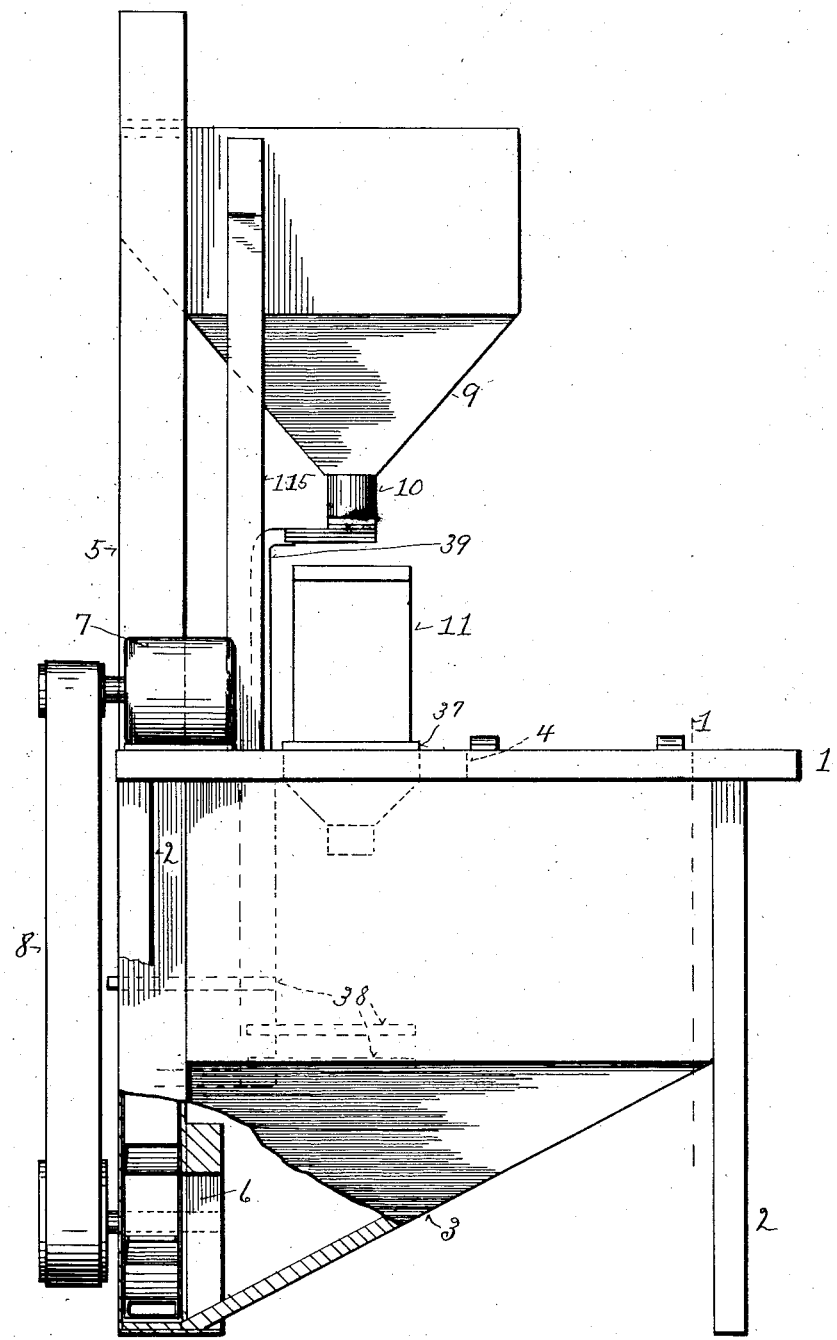
Figure 3:
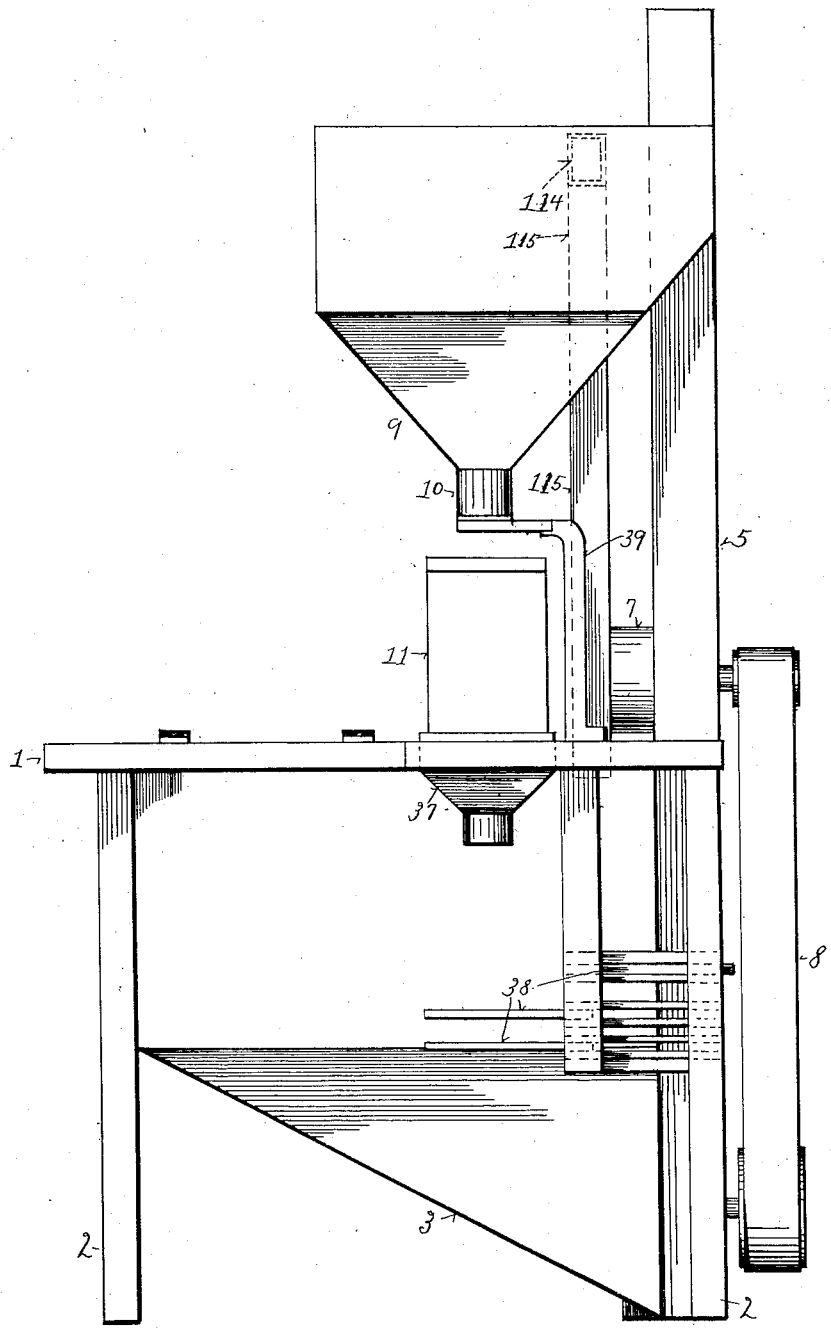

Figure 1 is a front elevation of a machine made in accordance with the principles of my invention, part being shown in section on a plane indicated by the line 1 in Fig. 2, and parts being broken away to disclose other parts shown in section. Figs. 2 and 3 are opposite end elevations. Fig. 4 is a central vertical longitudinal sectional elevation of the weighing machine proper. Fig. 5 is a plan view of the controlling lever and adjacent co-acting parts, the plan of the frame being indicated by the line 5 in Fig. 9. Fig. 6 is an enlargement of the latch shown in Fig. 10. Fig. 7 is a vertical transverse sectional elevation of the weighing machine proper, the frame being shown in section approximately on the plane indicated by the line 7 in Fig. 4. Fig. 8 is an end elevation of the weighing machine proper, adjacent portions of the frame being shown in section. Fig. 9 is an elevation of the controlling lever and adjacent co-acting parts. Fig. 10 is a sectional view, on a plane indicated by the line 10 in Fig. 4, of the bottom portion of the weighing receptacle. Fig. 11 is a view of the tripping device on a plane indicated by the line 11 in Fig. 5. Fig. 12 is a view of certain parts on a plane indicated by the line 12 in Fig. 5. Fig. 13 is a bottom view of the feed spout and shutters therefor. Fig. 14 is a view, partly in section, of the feed spout together with an auxiliary feed spout, the auxiliary feed spout being adapted for discharging a larger bulk into the weighing receptacle. Fig. 15 is a sectional plan on the line 15 in Fig. 14. Fig. 16 is the same on the line 16 in Fig. 14. Fig. 17 is an enlarged side elevation of the auxiliary, the operating rod for the shutters being shown in section as indicated by the line 17 in Fig. 14. Fig. 18 is a sectional plan view of a modification in which the auxiliary is controlled by the main controlling lever. Fig. 19 is a detail of the means for coupling the controlling lever with the mechanism for operating the shutters in the auxiliary spout.

Similar reference characters indicate similar parts throughout the several views.

Referring first to the general arrangement shown in Figs. 1, 2, and 3: As a main frame I use a table having a top 1, and suitable legs 2, the top of the table forming also the top of a bin 3 adapted to hold a comparatively large quantity of commodity. 4 is a door through which the commodity is put into the bin. 5 is an elevator adapted to carry the commodity from the bin from opening 6 to the small hopper 9 above the table top. The elevator is run by a motor 7 and a transmission belt 8. The small hopper 9 has a small feed spout 10 through which the commodity is fed into the weighing receptacle 11, the feed being controlled by means of the lever 12 and mechanism hereinafter described in detail. Near the top of the hopper is an opening 114 from which a spout 115 leads back to the bin; its purpose being an overflow pipe to return the surplus in the hopper to the bin. The weighing receptacle is adapted to discharge its contents when weighed through its bottom, as will be described hereinafter, into a chute 37, from which it passes into a sack or other package or receptacle supported on one of the series of shelves 38 slidably mounted in the frame underneath said chute 37; the object of the series of shelves being to bring the sacks of varying heights properly close up under the chute 37.

The top of the table is preferably at a height convenient for general usefulness in a retail store or shop; also it is of such height that the commodity may be easily put into the bin through the door, thus saving the trouble of raising the commodity to a great height above the weighing receptacle. Further, I contemplate the use of a quite small hopper, and, as hereinafter explained, the operation of the elevator during the weighing operation so that it will deliver into the hopper as much as or more than is normally discharged therefrom into the weighing receptacle, in order to maintain substantially a constant level in the hopper, the surplus if any returning to the bin through the overflow pipe. This feature is specially desirable in the case of an automatic weighing machine for the reason that a stream must be cut off and this stream would vary according to the pressure above; and by maintaining a constant level above, the pressure is constant. Also by using a small bin above, I greatly simplify the structure, avoid the use of a large bin up high, which makes the machine too top-heavy, cumbersome, and inconvenient for retail use.

The bottom of the weighing receptacle is shown in detail in Figs. 4, 6, 8, and 10. There are two doors 13 hinged on a rod 14 secured to and extending centrally between opposite sides of the can; and the doors slant from the center downwardly. Each is held closed by means of a latch mounted in a casing 15 secured to the can at the lower edge. 16 is the latch proper, pivoted at 19 and having a face 18 engaging under the adjacent edge of the door. The latch also has a slot 17 in which works the end of the arm 20 of an L-shaped lever pivoted at 21 and whose other arm 22 extends out horizontally. If the receptacle be lowered, as it will in the weighing operation, the arm 22 will strike against the screw 36 adjustably extended up from the table top 1, and assume the position shown in Fig. 6, releasing the latch from the door and permitting the door to fall open by gravity; upon raising the receptacle, the latch assumes its normal position, shown in Fig. 10, and upon raising the door, the latch will again engage its lower edge and support it until again withdrawn. Secured to the side edge of each door is a pin 23 which extends through a slot 24 in the side of the can and to which is pivoted the lower end of a link 25, the upper end of each link being pivoted to the lower end of a rod 27 which is slidably mounted in guides 28 on the side of the can and whose upper end is offset, as shown at 29; the purpose of this mechanism being obviously to close the doors by lifting the rod 27. Inasmuch as there is some lost motion in the latching and it is quite difficult to get a tight closure of the doors 13 at their lower edges, I provide a supplementary device for each door to obtain that result. Along each lower edge, I provide a strip 31 hinged on a rod 32 secured by brackets 33 to the under side of the door, and adapted to underlap and bear against the lower edge of the can under influence of the spring 34, each strip being notched at 35 to accommodate the latch. These strips permit the slight play necessary to secure a safe support for the door proper, and yet form a tight closure through which the commodity cannot sift.

The lower end of the feed spout 10 is reduced internally as shown at 40 (reference now being made specially to the details shown in Figs. 5, 7, 8, 9, 11, 12, and 13), and is closed by a pair of shutters 41 pivoted at 43 and having radial arms 42. 44 and 45 are plates forming a supporting frame immediately under the spout, and themselves supported on the bracket 39 (Figs. 1, 2, and 3). These plates have openings 46 concentric with the feed spout; and the under plate 44 is formed with an annular collar 47 (see Figs. 5 and 12) which is surrounded by the collar portion 48 of the lever 12, so that the lever oscillates thereon as on a pivot. The lever carries two upwardly projecting pins 49 in whose path the arms 42 of the shutters extend so that when the lever is oscillated to the position indicated by the dotted outline 50 in Fig. 5 the shutters will be opened. 51 is a downwardly projecting pin secured to the lever, and 52 is a spring fastened at one end to the pin 51 and at the other end to the frame plate 44 by means of a clip 53, its purpose being to restore the lever to normal position against the stop 54. Depending from plate 44 are two brackets 55 in which is mounted a shaft 56 carrying an arm 57 with a pin 58 and also carrying a pawl 59 hinged by means of a spring 60 to the shaft or to a hub or lug 61 secured thereto. The pin 58 engages in the offset 29 of the door-lifting rod 27. 62 is a lug depending from the lever 12; pawl 59 extends normally in the path of this lug, so that when lever 12 is oscillated, lug 62 turns pawl 60 and with it the shaft 56 and the arm 57 and pin 58, such operation lifting and closing the doors at the bottom of the weighing receptacle. The spring 72 restores the shaft and connected parts to their normal position shown in Figs. 9 and 12 when the lug has cleared the pawl. When the lever is restored to its normal position, the lug presses down the pawl on its spring hinge, and the spring hinge immediately returns the pawl to its normal position in the path of the lug, ready for the next operation.

The parts just described are so arranged that the shutters 41 are not opened until after the doors 13 are closed. That is, when the lever 12 has been moved to close the doors, the position of the pin being in this position indicated by the dotted outline 63 in Fig. 5, the pins are then in position so that the further movement of the lever to the position indicated by 50 will open the shutters 41. The lever is formed with a notch 64 in which the pawl 65 is adapted to engage and hold the lever against return movement when the lever has been moved to its extreme position 50. The upper end 66 of a finger extending upward from a lever 67 engages the pawl and actuates it. The lever 67 is pivoted to a bracket 69 depending from the frame plate 44 (see especially Fig. 11); its inner end 70 is weighted, and its outer end 68 extends in the path of a loop 71' secured to the upper edge of the can. The overweighting of the inner end causes the pawl 65 to engage in the notch 64, and the lowering of the can pulls down the outer end and releases the pawl from the notch, thereby permitting the spring 52 to restore the lever 12 to normal position.

Referring to Figs. 4 and 7: 73 is the frame of the scales or weighing machine proper, supported on the table top. 74 is the scale-beam, pivoted at 75 and carrying at one end a weight platform 76, its other end being bifurcated at 78, and pivoted to the weighing receptacle at 77. 79 is an evener rod pivoted centrally at 80 and at its opposite ends to the rod 81 of the platform 76 and to the rod 82 secured to the cross-rod 83 extending between opposite sides of the can; the purpose of the evener being, as is well known, to keep the platform and the weighing receptacle, or can, always in true vertical alinement. The scale beam is formed with an opening 120 between its sides at its main pivot. 84 are two bars rigidly secured to the scale-beam and extending down through the opening and carrying at their lower ends a transverse rod 85 on which is pivoted the lower end of a rod 86 which extends upwardly and supports at its upper end an elongated liquid receptacle 87 partially filled with mercury 88. 89 is a rod rigidly secured to the lower end of rod 86 and extending downwardly and toward the weight platform end of the scale-beam, and thence upwardly, as indicated at 90. 91 is a rod rigidly secured to the weight platform and extending toward the beam pivot, so as to be directly in the path of the lever 89—90. The rod 86 normally rests against the stop 92 rigidly secured to the scale beam. It will be noted that the rod 91 will move, as the weighing receptacle is lowered, with the platform 76, at a greater speed than the arms 89—90, which latter move at the same time only with the shorter radius, and thus the rod 91 will withdraw from the arm 90. But the parts are so adjusted that when this movement has progressed far enough, the mercury by shifting its position in maintaining its level in the oscillating receptacle, or tube, will cause the parts 86, 87, 88, 89, and 90, to be overweighted on the can side, and once overweighted on that side, it is clear that the parts (all being rigidly secured together and pivoted on rod 85) suddenly on the further shifting of the mercury fall over to the position shown at 93, when the arm 89—90 strikes against the rod 91 with considerable force, thus, suddenly, relatively speaking, shifting a considerable weight from the platform, or weight, side of the scale-beam, to the weighing receptacle side. It is this quick shifting on which I depend for actuating the automatic devices hereinbefore described. It will be noted that on return of the scale-beam to normal position (left side down), the rod 91 bears down on arm 89—90, thus restoring the parts 86, 87, 88, 89, 90 to normal position resting against the stop 92, and overweighted on the left-hand side.

Normally the feed-chute shutters 41 are closed, the doors at the bottom of the can are open, and the weighing receptacle is up. To attain a given weight in the weighing receptacle, a weight of proper proportions is placed on the platform (allowance being made for the extra weight of the mercury, etc.). The lever 12 is shifted, which closes the bottom doors and opens the feed-chute shutters, and becomes locked by pawl 65. The stream of commodity then flows into the can. When a sufficient weight to overcome the scale has been discharged into the can, the can lowers, and the mercury suddenly and quickly shifts its weight as hereinbefore described, and the following takes place: First, the loop 71 pulls down end 68 of lever 67, releasing pawl 65 from notch 64, permitting spring 52 to restore the lever 12 to normal position and also permitting springs 44' to close the feed-chute shutters; and, second, the further lowering of the can causes the latch arms 22 to strike against the stop-screws 36, thus releasing the doors which fall open permitting the commodity to discharge itself by gravity; whereupon, thirdly, the can being relieved of the weight, the scale-beam again tilts back to normal position. All parts are then in normal position, ready for the next operation. I also contemplate mounting an electric switch 113 upon the frame in suitable position so that when the lever 12 is shifted it will cause, by its co-acting part 112, said switch to be closed; and, upon return movement of said lever, said switch will automatically become open. This switch is for the purpose of controlling the motor so as to drive the elevator while the weighing is being done, and thus maintain the constant supply of commodity in the hopper.

Referring to Figs. 14, 15, 16, and 17: 94 is a larger spout or feed chute connected with the bin above the weighing receptacle and adapted to discharge into said receptacle. A shaft 96 is mounted in brackets 95 secured to the side of the larger spout, and carries two shutters 98 and 99, which are extended radially at an angle to each other, say at right-angles or it may be more or less. These shutters engage under the reductions 97 in the spout, and work through slots 100 in the sides of the spout. Normally the upper shutter is open and the lower one is closed. By turning the shaft, the lower one becomes open and the upper one closed. They are held in normal position and returned thereto by means of a spring 101. They are shifted to their secondary position by means of a rod 103 pivoted to an arm 102 extending out from the lower shutter. The obvious purpose of this device is to discharge into the weighing can a large volume of the commodity, considerably less however than the final weight desired, in order to expedite the weighing operation.

In Figs. 18 and 19 I have shown substantially the same mechanism, with the addition of a device or connection for operating it automatically by the main lever 12. The arm 102 has an upturned pin 104 engaging in the slot 105 between two fingers 106 of a ring 107 mounted on the spout 10 so as to oscillate thereabout. The ring 107 also has an arm 108 projecting therefrom above the main lever 12, and to this arm is pivoted a forked arm 110, as indicated at 109, which forked arm is adapted to engage the sides of the lever 12 when turned down. The operation of the lever also operates the shutters 98 and 99 to effect the quick discharge of the commodity in the larger spout between them. The return movement of the lever restores the shutters to normal position. When the auxiliary spout is not to be used, the arm 110 is raised on its pivot. It is held in either of its positions by the spring 111. The spout is reduced immediately above each shutter, as shown at 97, in order to prevent the commodity from flowing out through the slots 100.

What I claim is:

1. The combination of a table having a top, a bin arranged under said top, a door in said top giving access to the bin, a weighing machine supported on the table and including a weighing receptacle, a chute leading from said weighing receptacle, a series of slidable shelves arranged above each other under said chute and supported by the table, a hopper supported on the table above the weighing receptacle and having a spout adapted to discharge into said receptacle, a lever for controlling such discharge, an elevator for conveying the commodity from the bin to the hopper, a motor for driving the elevator, and a means associated with the lever for controlling the motor.

2. The combination of a table having a top, a bin arranged under said top, a door in said top giving access to the bin, a weighing machine supported on the table and including a weighing receptacle, a chute leading from said receptacle, a suitable sack support under said chute, a hopper supported on the table above the receptacle and having a spout adapted to discharge into said receptacle, a lever for controlling such discharge, an elevator for conveying commodity from the bin to the hopper, and means for driving the elevator.

3. The combination of a frame formed with a bin, a weighing machine above the bin and including a weighing receptacle, a hopper supported on the frame above the receptacle and having a spout adapted to discharge into the receptacle, an elevator for conveying commodity from the bin to the hopper, and an overflow pipe from the hopper leading back to the bin.

4. The combination of a frame formed with a bin, a weighing machine above the bin and including a weighing receptacle, a hopper supported on the frame above the weighing receptacle and having a spout adapted to discharge into said receptacle, a means for controlling said discharge, an elevator for conveying commodity from the bin to the hopper, means for driving said elevator, means for controlling said driving means, said second-named controlling means being controlled by the means for controlling said discharge, and an overflow pipe leading from the hopper back to the bin.

5. The combination of a frame formed with a bin, a weighing machine above the bin and including a weighing receptacle, a hopper supported on the frame above the receptacle and having a spout adapted to discharge into said receptacle, means for controlling the discharge, an elevator for conveying commodity from the bin to the hopper, means for driving the elevator, and means for controlling said driving means, said second-named controlling means being controlled by the means for controlling the discharge.

6. The combination of a frame formed with a bin, a weighing machine above said bin and including a weighing receptacle, a hopper supported on the frame above said receptacle and having a spout adapted to discharge into said receptacle, means for controlling such discharge, an elevator for conveying commodity from the bin to the hopper, and an overflow pipe leading from the hopper back down to the bin.

7. The combination of a frame formed with a bin, a hopper supported on the frame above said bin and having a spout, shutters for said spout, springs for closing said shutters, an elevator for conveying commodity from the bin to the hopper, a scale-frame supported above said bin and below said hopper, a scale-beam pivoted on the scale-frame, a weighing receptacle supported on the scale-beam below said spout, doors in the bottom of said receptacle, latches for holding said doors closed, means for closing said doors, tripping device for unlocking said latches when the receptacle is lowered, means for opening said shutters succeeding the closing of said doors, a pawl for holding said shutters open, and a tripping device for releasing said pawl upon the lowering of the receptacle.

8. The combination of a frame, a scale-beam pivoted thereon, a weighing receptacle supported on the scale-beam, a rod extending across the receptacle near its bottom and centrally disposed, doors hinged to said rod and slanting downwardly toward the respective sides, latches for holding the doors in closed position, a strip hinged to each door near its lower edge, said strip underlapping the adjacent lower edge of the receptacle, and springs for pressing said strip against said edge.

9. The combination with a weighing receptacle, of a rod extending centrally across the lower end thereof, two doors pivoted on said rod and extending to the respective sides, latches for holding the doors closed, a strip hinged to each door and underlapping the adjacent portion of the side, and springs for pressing said strips against said sides.

10. The combination with a weighing receptacle, of two doors hinged centrally thereto at the bottom thereof and extending toward the sides, a strip hinged to each door and projecting beyond the extreme edge of the door, springs for pressing said strips against said sides, and latches for holding the doors closed.

11. The combination with a weighing receptacle, of a door hinged thereto at the bottom, and extending toward the side, a strip hinged to said door and extending beyond the end of the door and pressing against the side of the receptacle, springs for pressing said strip against the side, and a latch for holding the door closed.

12. In a weighing machine, the combination of a frame, a scale-beam pivoted thereon, a weight-platform pivoted to one end of the scale-beam, a weighing receptacle pivoted to the other end of the scale-beam, an evener pivoted to the frame and connected with the platform and the receptacle for maintaining them in true vertical alinement, said scale-beam being formed with an opening adjacent its fulcrum, rods rigidly secured to the scale-beam and extending down into said opening, a transverse rod carried by said rods below said fulcrum, an upwardly extending rod pivoted on said last-named rod and an elongated receptacle supported at the upper end thereof, a quantity of mercury partially filling said receptacle so as to be capable of flowing from one end to the other thereof, a lever rigidly secured to said upwardly extending rod and extending toward said platform end of the scale-beam, a rod rigidly secured to the platform and extending to above said last-named lever, a back rest rigidly secured to the scale-beam for supporting said upwardly-extending rod, said parts being so arranged that normally said upwardly-extending rod rests against said back-rest upon initial movement of the scale-beam, the tilting of the mercury receptacle causes the mercury to flow to the opposite end of the receptacle and overbalance the parts so as to shift the load of said mercury suddenly and quickly from the platform end of the scale-beam to the opposite end.

13. In an automatic weighing machine, the combination with a frame and a scale-beam pivoted thereon, of a receptacle, a quantity of mercury partially filling said receptacle, a support for said receptacle pivoted below the same, said pivoting being in such manner that normally the receptacle overbalances on said pivot against one end of the scale-beam and so that movement of the scale-beam away from normal position causes the sudden and quick tilting of the receptacle and the shifting of the mercury from one end to the other and overbalances said receptacle and causes it to bear against the other end of the scale-beam, together with means for restoring the parts to normal position.

14. In an automatic weighing machine, the combination of a frame, a hopper mounted thereon and having a spout, a scale-beam, a weighing receptacle adapted to receive the discharge from the spout, doors secured to the bottom of the receptacle, a latch for holding the doors closed, shutters for the spout, springs for holding said shutters closed, means for closing said doors and opening said shutters, a latch for holding said last-named means in operated position, tripping devices operable by the lowering of the weighing receptacle for releasing said latches, and a mercury tube with mechanism for automatically shifting the mercury therein from end to end and to shift the weight thereof from one side to the other of the scale-beam.

15. In an automatic weighing machine, the combination with a weighing machine proper having a weighing receptacle, of a hopper having a feed spout adapted to discharge into said receptacle, shutters for the feed spout, a lever for controlling said shutters, a larger spout connected with the hopper and adapted to discharge into said receptacle, shutters in said second-named spout spaced apart from each other, and means for operating said shutters in unison the one being closed when the other is open.

16. In an automatic weighing machine, the combination with a weighing machine having a weighing receptacle, of a hopper having a feed spout adapted to discharge into said receptacle, a lever for controlling the discharge, a larger spout adjacent the first-named spout, shutters in said larger spout spaced vertically apart from each other and operable in unison the one being closed when the other is open, and means for connecting said shutters with and disconnecting them from said controlling lever.

In testimony whereof I have affixed my signature in presence of two witnesses.

CHARLES D. SCOTT.

Witnesses:
C. J. ROSEN,
J. M. STARK.